US007280888B2

(12) United States Patent
Edel et al.

(10) Patent No.: US 7,280,888 B2
(45) Date of Patent: Oct. 9, 2007

(54) METHOD AND SYSTEM FOR PREPAID INSERTER MACHINE

(75) Inventors: Eddy Edel, Friedberg (DE); Andreas Ripken, Neu-Ansback (DE); Andreas Volz, Friedberg (DE)

(73) Assignee: Pitney Bowes Deutschland GmbH, Heppenheim (DE)

( * ) Notice: Subject to any disclaimer, the term of this patent is extended or adjusted under 35 U.S.C. 154(b) by 322 days.

(21) Appl. No.: 11/071,081

(22) Filed: Mar. 2, 2005

(65) Prior Publication Data

US 2006/0200429 A1 Sep. 7, 2006

(51) Int. Cl.
*G06F 7/00* (2006.01)

(52) U.S. Cl. ....................... 700/220; 700/222; 700/223

(58) Field of Classification Search ................ 700/219, 700/220, 222, 223; 270/52.05, 58.06
See application file for complete search history.

(56) References Cited

U.S. PATENT DOCUMENTS

| | | | | | |
|---|---|---|---|---|---|
| 4,429,217 | A | * | 1/1984 | Hill et al. | 235/380 |
| 4,585,220 | A | * | 4/1986 | Zemke et al. | 270/52.03 |
| 4,601,394 | A | * | 7/1986 | Hutner | 209/3.3 |
| 4,974,019 | A | * | 11/1990 | Nishioka et al. | 399/23 |
| 4,987,547 | A | * | 1/1991 | Rabindran et al. | 700/220 |
| 5,058,873 | A | * | 10/1991 | Hewitt et al. | 270/52.13 |
| 5,177,687 | A | * | 1/1993 | Baggarly et al. | 705/406 |
| 5,909,814 | A | * | 6/1999 | Arikawa | 209/534 |
| 6,244,583 | B1 | * | 6/2001 | Ohmichi et al. | 270/58.09 |
| 6,615,105 | B2 | * | 9/2003 | Masotta | 700/219 |
| 7,013,199 | B2 | * | 3/2006 | Smith et al. | 700/222 |
| 2003/0160377 | A1 | * | 8/2003 | Meckes et al. | 271/10.01 |
| 2004/0181308 | A1 | * | 9/2004 | Hayashi et al. | 700/223 |
| 2006/0144260 | A1 | * | 7/2006 | Foutz et al. | 101/35 |

* cited by examiner

*Primary Examiner*—Khoi H. Tran
(74) *Attorney, Agent, or Firm*—Christopher H. Kirkman; Steven J. Shapiro; Angelo N. Chaclas

(57) ABSTRACT

In a mail inserting machine that a user uses to process mailpieces for a prepaid quantity, a counter is installed in an inaccessible manner to keep count of the processed mailpieces. The machine is disabled when the prepaid quantity is used up. In order to allow the user to pay for additional quantity, the manufacturer embeds a finite number of unlocking codes in the machine. Each code for the particular machine is activated in sequence. When the user needs to replenish the inserter counter, he calls the service counter and gives his machine serial number. The user is given the next unlocking code after he agrees to pay for the additional amount. The user can enter the code to unlock the additional preset quantity. The same code will not work again. In a further embodiment, the rate of mailpiece processing is also monitored to ensure that design limitations are not exceeded. The machine is automatically shut down when a predetermined processing rate is exceeded.

25 Claims, 8 Drawing Sheets

METHOD AND SYSTEM FOR PREPAID INSERTER MACHINE

TECHNICAL FIELD

The present invention relates generally to an envelope inserting machine and, more particularly, to a prepaid inserting machine.

BACKGROUND OF THE INVENTION

A mass-mailing system, in general, has an enclosure supply section and an insertion station. The enclosure supply section has a gathering section where the enclosure material is gathered before it is inserted into an envelope in the insertion station. This gathering section is sometimes referred to as a chassis subsystem, which includes a gathering transport with pusher fingers rigidly attached to a conveying means and a plurality of enclosure feeders mounted above the transport. If the enclosure material contains many documents, these documents must be separately fed from different enclosure feeders. After all the released documents are gathered, they are put into a stack and the stack is conveyed to an insertion station to be inserted into an envelope. Envelopes are separately fed to the inserting station, one at a time, and each envelope is placed on a platform facing down with its flap flipped back all the way. At the same time, a mechanical or pneumatic device is used to open the envelope. The stack of enclosure material is than automatically inserted into the opened envelope.

Some mailing systems have a folding station for folding the enclosure material into a packet. The packet is then conveyed to the inserting station for insertion.

An exemplary mass-mailing system 1, as shown in FIG. 1, includes an enclosure supply station 10, an insertion station 20 and a mail processing station 30. As mentioned above, the enclosure supply station 10 can be a folding station or an enclosure gathering station. The enclosure gathering station gathers a plurality of documents 100 and collates them into a stack 110. After the enclosure is inserted into an envelope 120 in the insertion station 20, the stuffed envelope 130 is sealed and addressed to become a complete mailpiece 140. This can be carried out in the processing station 30. The processing station 30 may have a postage meter to provide a postage indicia on the envelope. The processed mailpieces are typically stacked.

Inserter machines are well known in the art, and need not be described in detail for purposes of this application. For example, DePasquale et al. (U.S. Pat. No. 4,817,368) discloses a mail inserting and collating apparatus that includes an envelope conveyor for continuously conveying envelopes along a predetermined route to receive a plurality of inserts. The inserted envelopes are then sealed in another path. Chodack et al. (U.S. Pat. No. 6,418,357) discloses a method for synchronizing an envelope inserter wherein the motion of a collating transport motor is synchronized to an overhead transport motor so that the collation of enclosure material can be inserted into an envelope. Allen et al. U.S. Pat. No. 6,305,680) discloses a system for providing a set of collated enclosure material to an inserter system for envelope insertion purposes. Belec et al. (U.S. Pat. No. 5,388,388) discloses an envelope insertion station operatively connected to a document feeding device for receiving documents to be inserted into an envelope.

Typically an enclosure supply station 10 comprises a plurality of enclosure feeders 12, as shown in FIG. 2. Each of enclosure feeders 12 is used to release one sheet of documents at a time onto a chassis 14. Feeders 12 may be of several different types, including rotary or swing-arm feeders. The released documents are carried downstream on a conveyer belt 16 driven by a transport mechanism 52, for example, so that the documents can be collated into a stack 110. In the insertion station 20, an envelope feeder 22 is used to release one envelope at a time into an insertion area so as to allow an insertion device 24 to insert the document stack 110 into the envelope. The insertion station 20 is operatively linked to a transport mechanism 54 for driving the stuffed envelope 130 out of the insertion area. The stuffed envelope 130 may be gathered by an operator and moved into the processing station 30. As shown in FIG. 2, a plurality of motion control units 70 are used to drive the transport mechanisms 52, 54, the insertion device 24, the envelope feeder 22 and the enclosure feeders 12. These motion control units are under the command of a central control console 200. The control console controls the sequence of events in the insertion operations. It controls the timing of each enclosure feeder, the timing of envelope feeder and the speed of the transport mechanisms, for example. The insertion station and the enclosure supply station may have a plurality of sensors 62, 64, 66 to ensure that the machine is operating properly. These sensors are operatively connected to the control console for jam monitoring, for example.

Inserter machines can be leased to a mailer who may not have the need or financial resources to buy such a machine. Thus, it is advantageous and desirable to provide a method and device to allow and monitor the use of the leased machine to make sure that the machine is used in accordance with limitations agreed in the lease.

SUMMARY OF THE INVENTION

In an inserter machine that a customer or a lessor uses to process mailpieces for a prepaid quantity, a mechanism is installed in a substantially inaccessible manner to keep count of the processed mailpieces. The machine will be disabled when the prepaid quantity is used up. However, it is advantageous to give the user a warning message when the remaining count is low so that the user has a choice to keep using the machine until the prepaid quantity is depleted, or to prepay for an additional quantity. A counter, which is substantially inaccessible to the user, is decremented when a mailpiece is processed. The counter can be incremented for replenishing. The count on this inaccessible counter is read by a data processor so that the count can be displayed on a separate counter or display device. When the count falls below a certain threshold, the warning message can be displayed on the same display device or announced in a different manner. The communications between the data processor and the hidden counter can be encoded or encrypted in order to prevent the user from deciphering. The counter and data processor can be implemented in the central control console that controls the operations of the inserter machine. If the user attempts to interfere or to alter the communications between the data processor and the counter, the user faces the risk that he inadvertently interrupts the normal operations by the central control console, rendering the inserter machine inoperable.

DETAILED DESCRIPTION OF THE INVENTION

Figure 1:
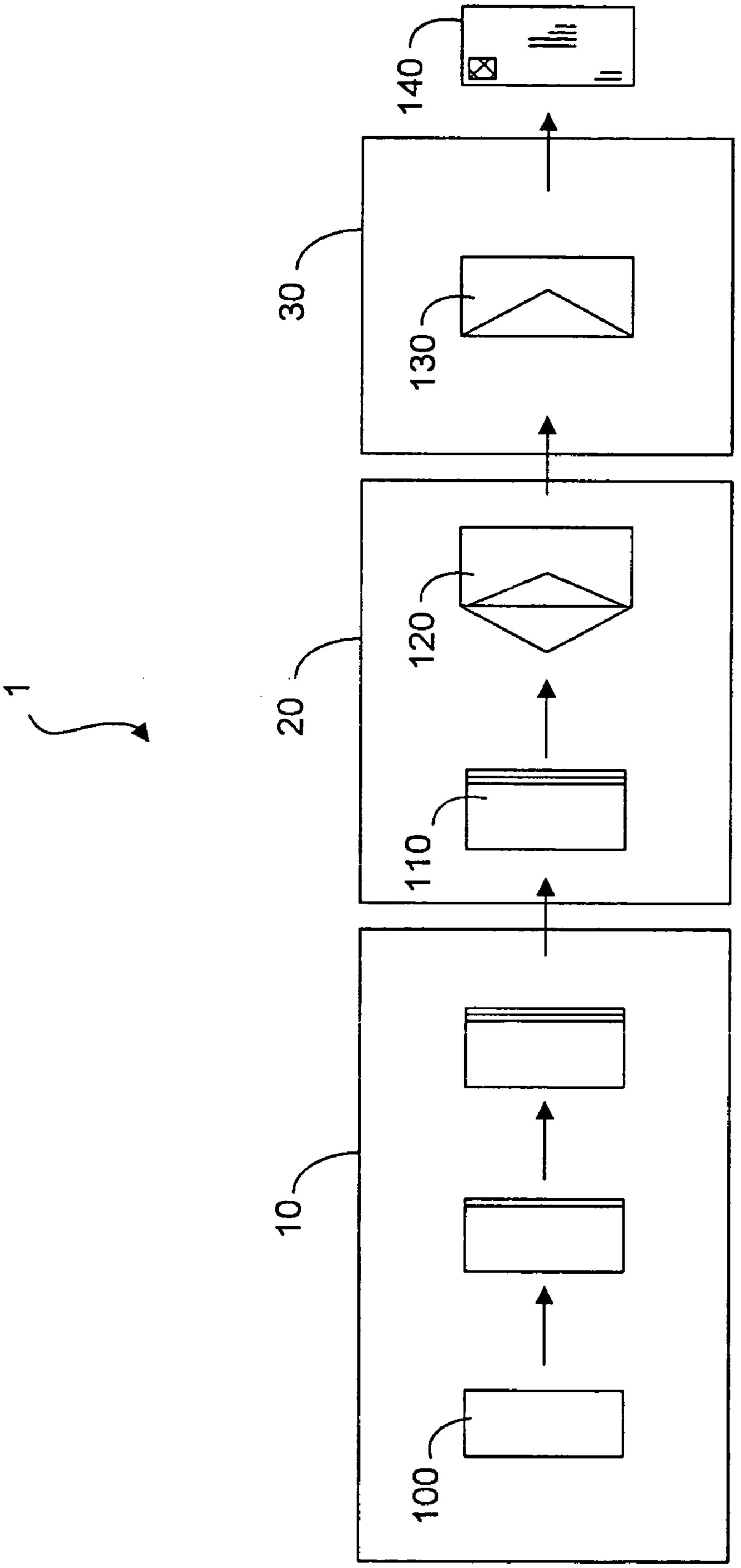
FIG. 1 (prior art)
FIG. 1 is a schematic representation showing a typical mass mailing machine.
Figure 2:
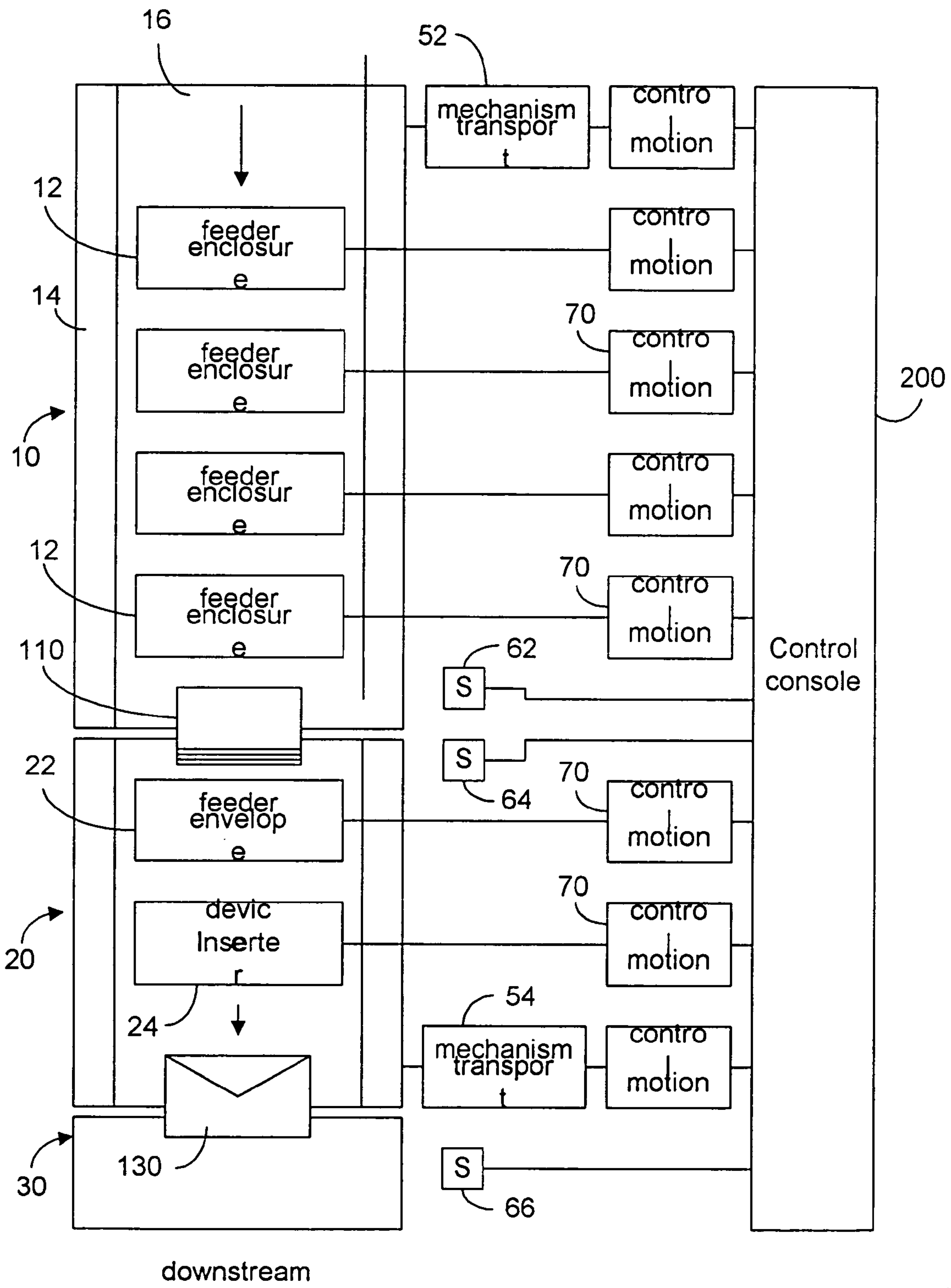
FIG. 2 (prior art)
FIG. 2 is a schematic representation showing various motion mechanisms and controls in a typical mailing machine.

As described previously in regard to the inserter machine as shown in FIG. 2, the central control console 200 controls all of the moving mechanisms in the inserter machine. The control console has a motion control logic 210 to set the timing of each of the moving mechanisms, including the insertion device 24 and the envelope feeder 22 (see FIG. 2). In normal operations, each of the envelopes released by the envelope feeder results in one complete mailpiece. Thus, it is possible to count the number of completed mailpieces by counting the envelope releasing commands within the motion control logic itself. Likewise, the commands to the motion control unit linking to the insertion device 24 can also be used to count the number of completed mailpieces.

Figure 3A:
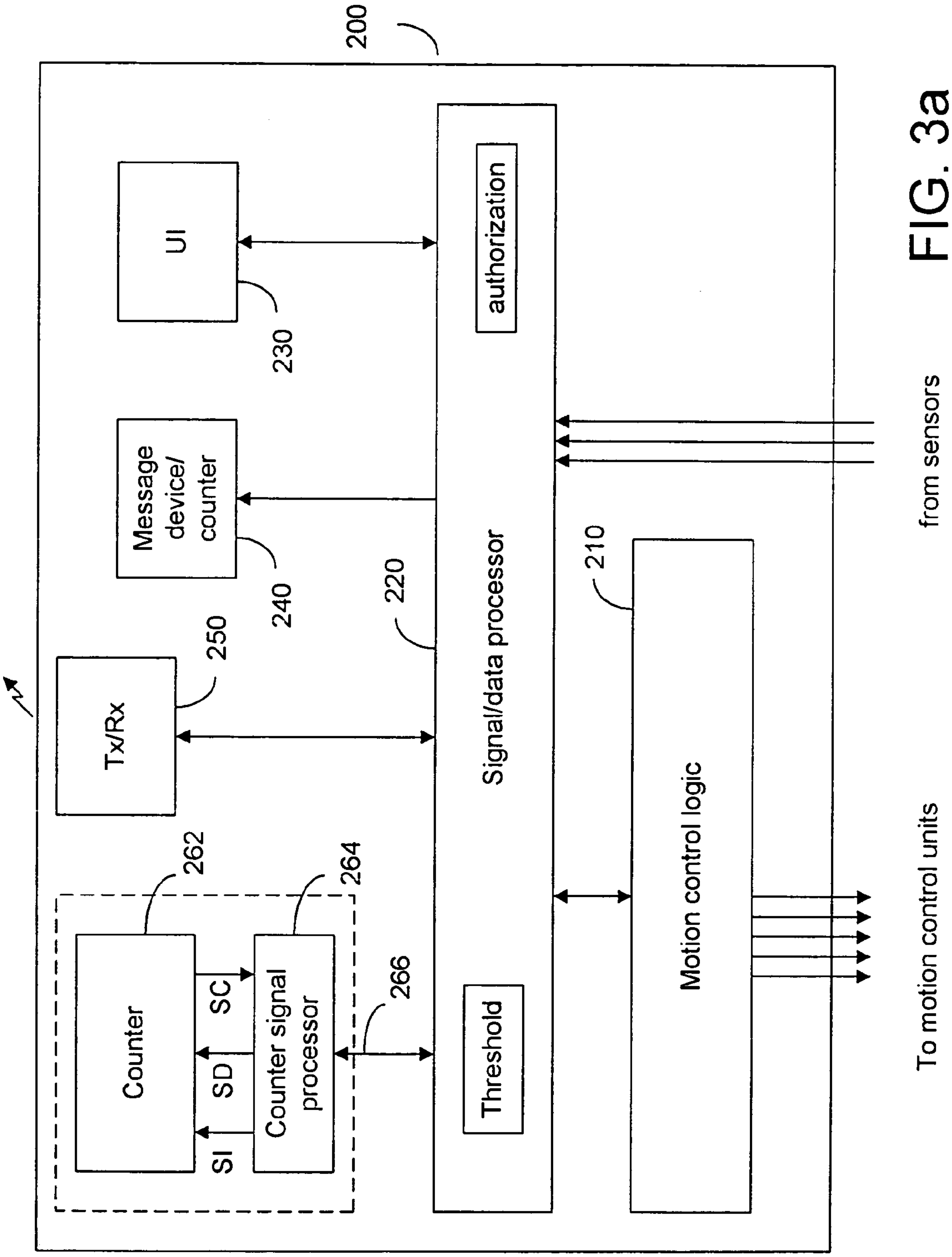
FIG. 3*a* is a block diagram showing a central control console in a mailing machine, according to an embodiment of the present invention.

Alternatively, the sensor 64 can be used as a counting device. As shown in FIG. 3, the control console 200 has a signal/data processor 220, operatively connected to a user interface 230, a message device 240 and a counter 262. Typically, the processor 220 is programmed to oversee the overall operations of the inserter machine. For example, the processor 220 determines the timing of the enclosure feeders based on the number of documents to be inserted into an envelope. The processor 220 can disable the motion control logic 210 in order to stop the machine when a jam occurs, for example.

When a user prepays for the use of the machine, the processor 220 sends a signal through the communication link 266 to set the counter to the prepaid quantity. The setting signal is denoted by SI. The processor 220 also sends a different signal to the counter 262 in order to decrement the counter for each completed mailpiece. The decrement signal is denoted by SD. Through the communication link 266, the processor 220 "reads" the remaining count on the counter 262. The count reading signal is denoted by SC. The remaining count on the counter 262 can be displayed on the message unit 240 to allow the user to know how many more mailpieces he can rightfully make.

In order to prevent the user from reading the messages in the signals conveyed between the counter 262 and the processor 220, it is advantageous to encode or encrypt those signals. For example, while the decrement signal SD can be a single pulse with a certain pulse width, the signal sent from the processor 220 through the link 266 can be a long string of pulses. Likewise, the remaining count in the counter as conveyed to the processor 220 is embedded in a code known to the processor 220. For signal concealment purposes, it is possible to use a counter signal processing unit 264 to encode or encrypt the signals conveyed from the counter 262 to processor 220, and to decode or decipher the signals conveyed from the processor. With the counter signal unit 264, the processor 220 can receive an encoded or encrypted signal from the processing unit 264 acknowledging receipt of the decrement signal SD or of the setting signal SI, for example.

With encoded or encrypted communications between the counter 262 and the processor 220, it would be difficult for a user to tamper with the counter in an attempt to increase the remaining counter or to block the decrement signal. While it may be possible for a user to read the signals through the link 266, it would be difficult for the user to change the signals without interrupting the normal operations of the inserter machine. For example, by blocking the decrement signal, the user may inadvertently resets the counter 262 to zero. Furthermore, the processor 220 can be programmed to notice any changes in the acknowledgment signal after a decrement signal or a setting signal is sent. If changes are detected, the processor 220 can send out a warning message on the message unit 240 or to halt the operations.

Figure 5:
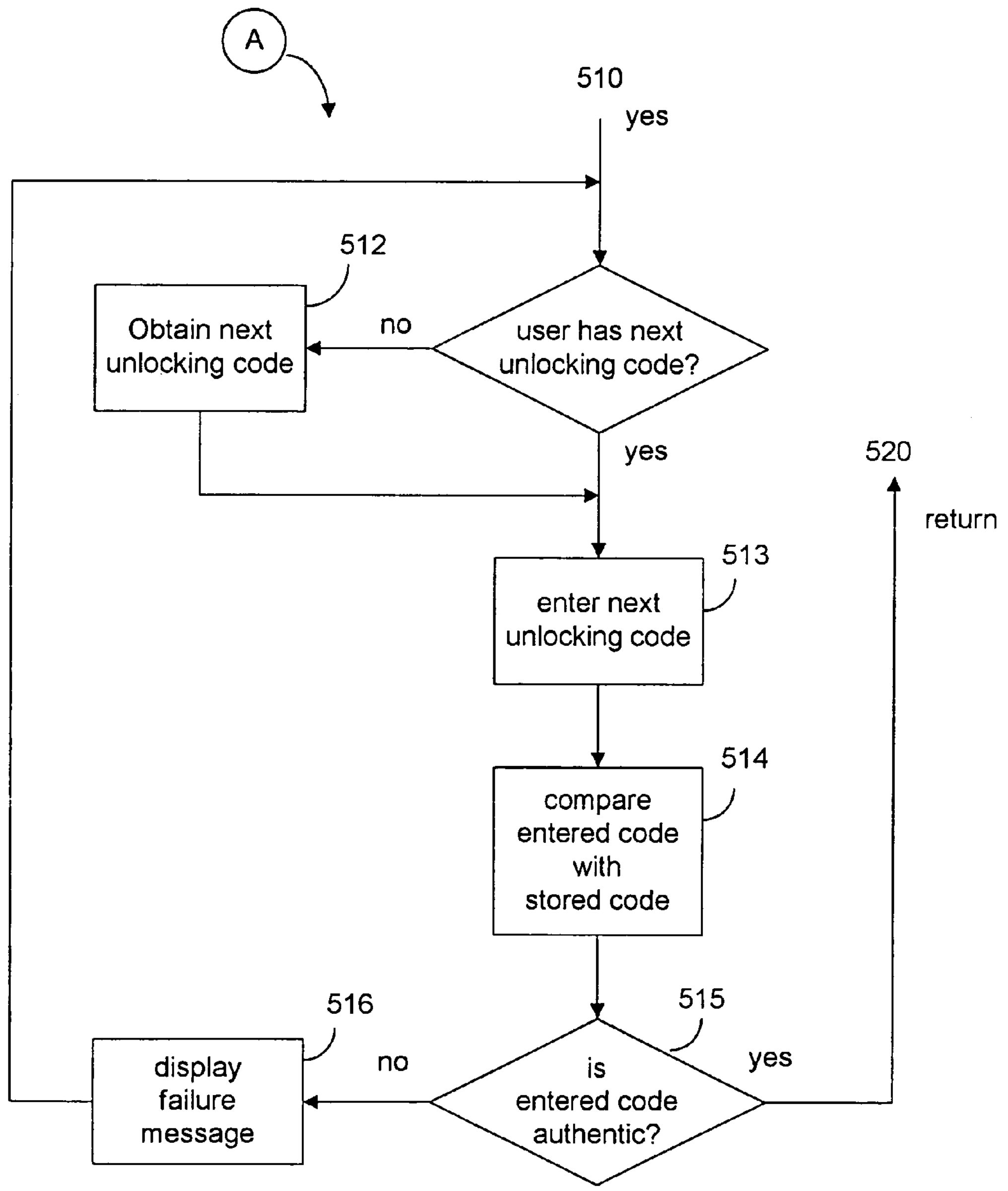
FIG. 5 is a flowchart illustrating a code authentication process for counter replenishment.

Under normal operations, when the count on the counter 262 falls below a predetermined threshold, it is advantageous to send a warning message to the user, indicating that the prepaid quantity is about to be used up. The user has a choice to prepay for an additional quantity or to continue the operations. If the user decides to prepay for more, replenishment can be accomplished through a transceiver 250 by an authorized party. Alternatively, the authorized party can increment the count on the counter via the user interface 230 through an authentication process. The authentication process is illustrated in FIG. 5. If the user decides to continue to use the inserter machine without replenishment, the machine will stop after the count reaches zero or after the user overuses by an allowed quantity.

Figure 4:
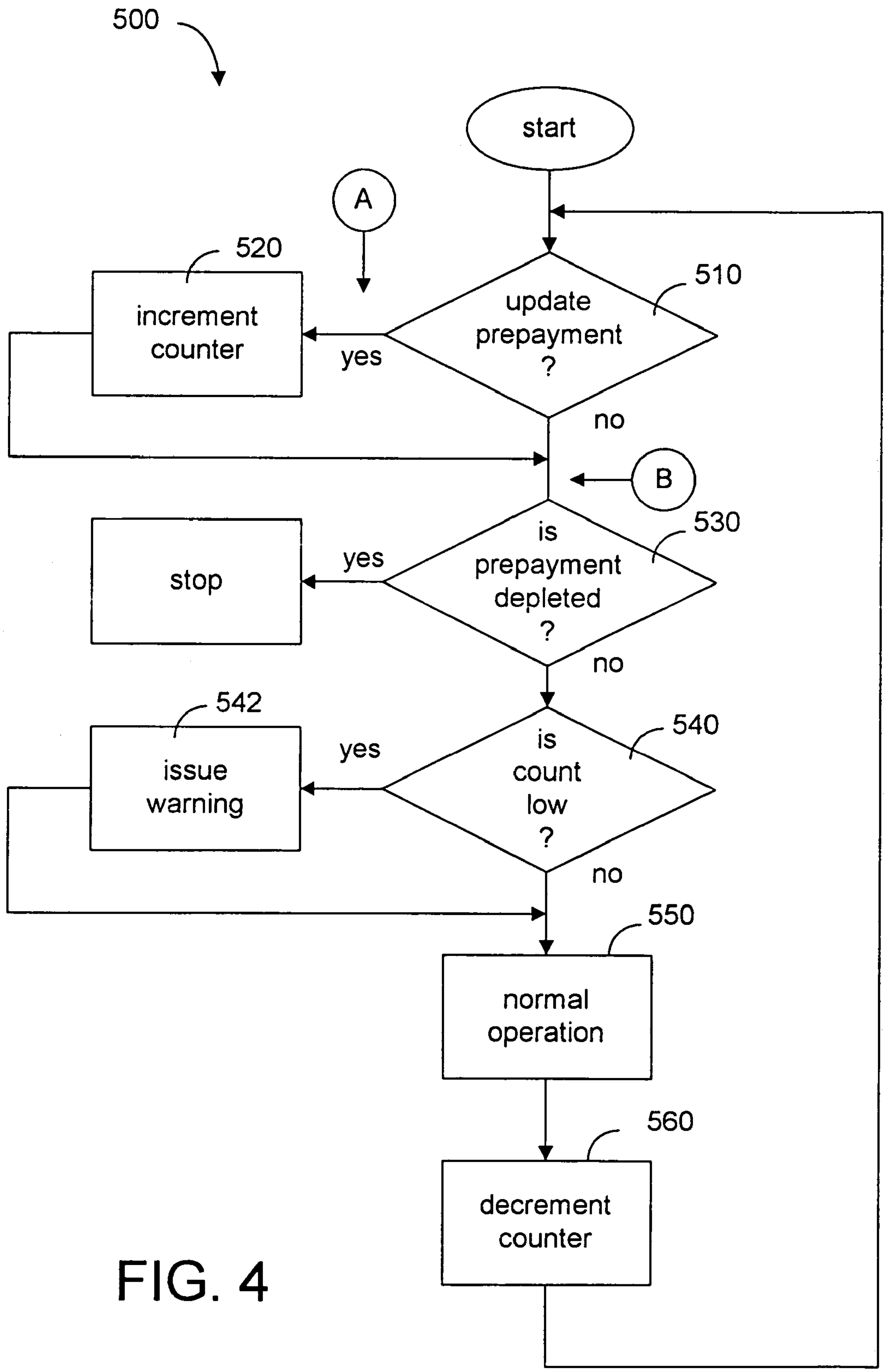
FIG. 4 is a flowchart illustrating the method of controlling the operation of the inserter machine, according to the invention.

The method of controlling operation of an inserting machine, according to the present invention, can be illustrated in the flowchart 500, as shown in FIG. 4. As shown in FIG. 4, it is determined at step 510 whether a user wants to prepay for a quantity. If so, the counter is incremented accordingly at step 520. The count on the counter 262 is monitored at step 530. If the count reaches zero or fall below a certain negative value representing an allowable overuse amount, then the operation is stopped. Otherwise, the count on the counter is compared to a threshold value at step 540. If the count falls below the threshold value indicating the remaining prepaid quantity is low, a warning message is provided at step 542 to alert the user of the low remaining quantity. Otherwise normal operation is maintained at step 550 and the counter is decremented at step 560. The cycle loops back to step 510.

It may be desirable that, when the user wants to replenish the counter by prepayment, the user is required to enter a password or code between step 510 and 520 in an authorized replenishing process (marked by letter A), as shown in FIG. 5. It is possible that the manufacturer of the inserter machine embeds a finite number of unlocking codes in the inserter machine. The unlocking codes are randomly generated and are unique to a particular machine, for example. The codes can be embedded in the signal/data processor 220 or the counter signal processor 264, for example. Each code for the particular machine is activated in sequence. When an inserter machine user needs to replenish the counter, he or she calls the service centers to give his machine serial number. The service center keeps a record of all the unlocking codes for each machine. Each machine has different codes embedded therein. For its record, the service center retrieves the next activation or unlocking code. Upon agreeing to pay for the additional usage, the user is given the next activation code. The user enters the code and the preset quantity of usage is unlocked. The same code will not work again because the next code is different and is unrelated to the previous one. As shown in FIG. 5, if the user has not called the service center to obtain the next unlocked code, the user will do so at step 512. The user enters to code at step 513. The inserter machine compares the entered code with the next unlocked code embedded in the machine (step 514). The machine determined whether the entered code matched the embedded code at step 515. If the next unlocked code is a correct one, then the process returns to step 520 (FIG. 4). Otherwise, a failure message is displayed at step 516. It is possible that the user enters the authorized code incorrectly or he took down the code incorrectly. The user can try to enter the code again or to call the service center to obtain the correct next unlocked code.

Alternatively, replenishment may be carried out by the service center by a signal sent over a communication network after the user agrees to pay for the additional usage.

Figure 3B:
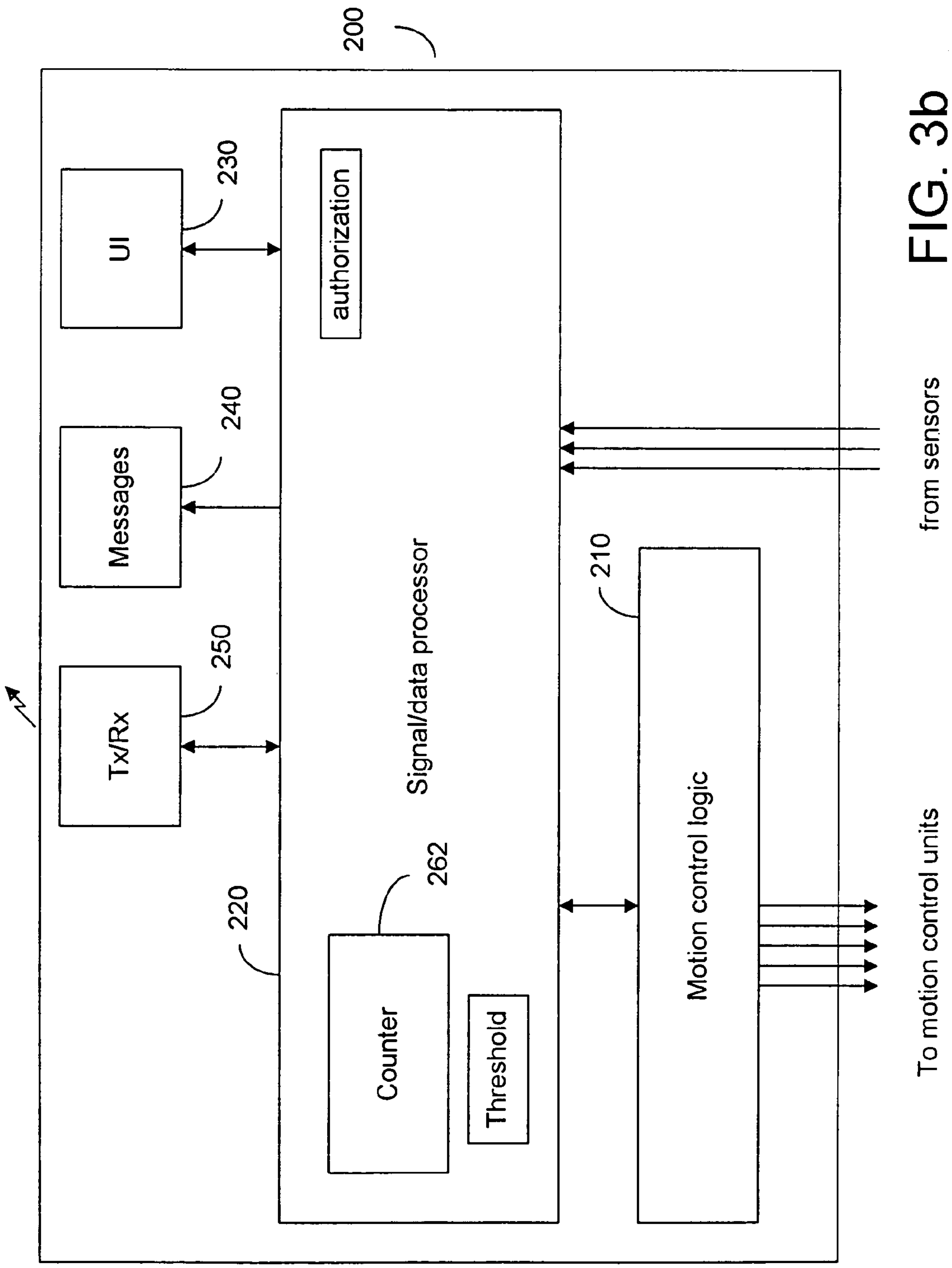
FIG. 3*b* is a block diagram showing another embodiment of the present invention.
Figure 6:
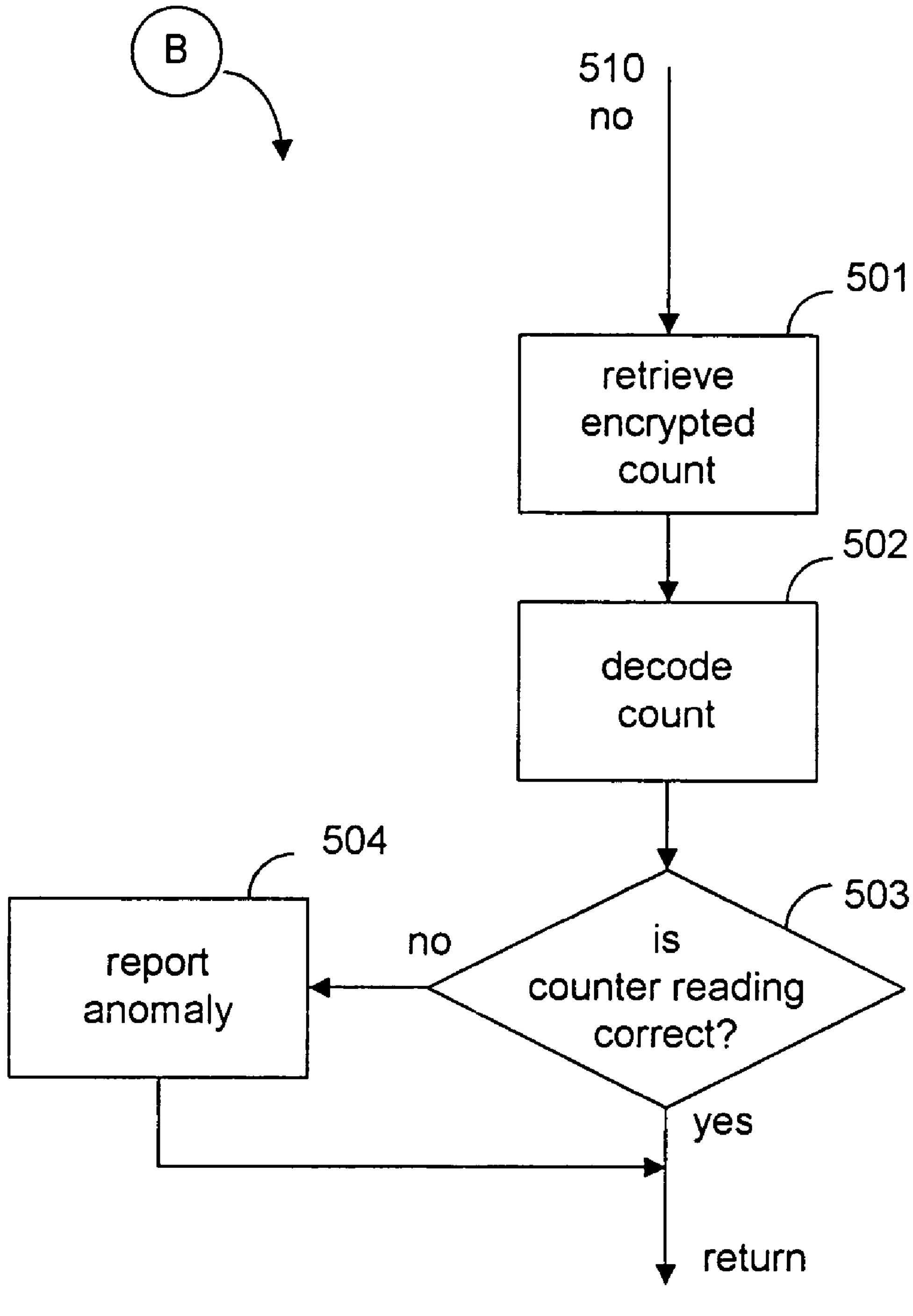
FIG. 6 is a flowchart illustrating a counter verification process to prevent counter tampering.

In sum, the present invention provides a method and device for preventing counter tampering in an inserting machine with prepaid use limitations. According to the present invention, the counter is maintained in a substantially inaccessible manner. It is advantageous to have a separate counter 262, along with a counter signal processing unit 264, operatively linked to the signal/data processor 220. In order to ensure that the counter 262 has not been altered or otherwise tampered, it is possible to protect the processor 220 in a physically secure structure, for example, in a sealed metal box. The physically secure structure can be designed to provide an indication if physical tampering is detected. It is also possible to monitor the count on the counter 262 at step 530 (marked by letter B) using a known encryption and decryption technique, as shown in FIG. 6. As shown in FIG. 6, the count on the counter 262 is retrieved at step 501 for verification purposes. Because the count is encrypted, it must be decrypted or decoded at step 502 to reveal a mathematical representation of the count. These steps can be carried out within the processor 220. If it is determined at step 503 that the decoded count is correct (by comparing it to the previous count, for example), the machine operation continues at step 540, as shown in FIG. 4. Otherwise, tampering is presumed and should be reported at step 504. This approach allows retrofitting of an existing inserter machine to serve the intended purpose. However, it is possible to hide the counter within the integrated circuit of signal/data processor, as shown in FIG. 3*b*. As such, no encoding or encryption would be necessary.

Figure 7:
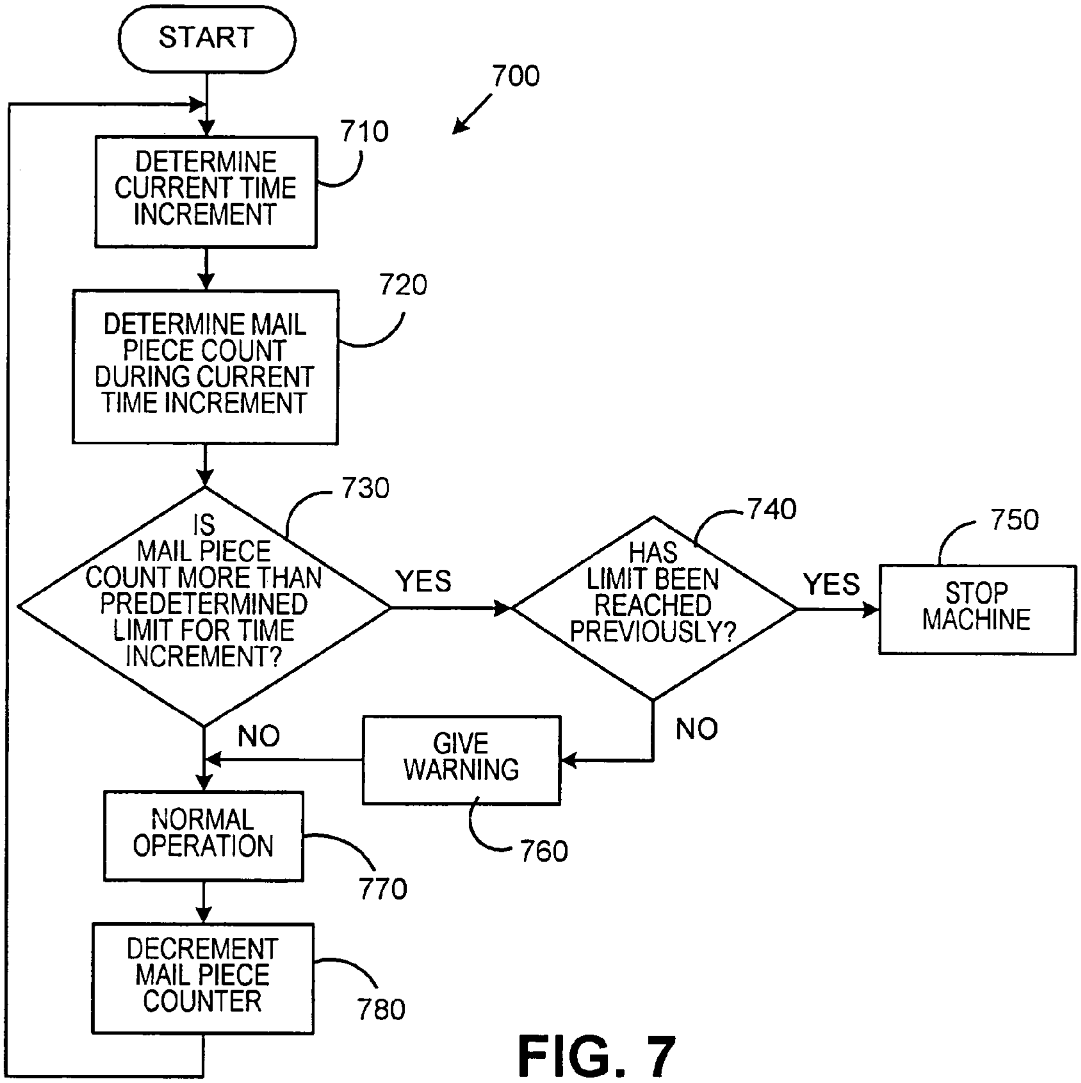
FIG. 7 is a flowchart illustrating an embodiment for preventing overuse of the inserter machine for a predetermined period of time.

FIG. 7 depicts a flowchart 700 of an enhanced embodiment of the invention whereby a leased inserter machine 1 is protected from harmful overuse over short periods of time. By running an inserter machine at its maximum rate for prolonged periods of time, excessive wear on the equipment and potential breakdowns will result. Accordingly, the machine owner may require in a lease that the machine not be used to process more that a predetermined maximum number of mailpieces over a period of time. For example, daily, weekly, or monthly limits could be set.

Using the enhanced embodiment of the invention, the inserter machine can be self-regulating to ensure that usage rate requirements are complied with. At step 710 the inserter determines the current time increment for which rate regulation will be considered. The time increment can be static intervals that are programmed into the counter 262. For example, the time increment could be a Sunday to Saturday calendar week, or a calendar month. Alternatively, the time increment may be dynamically determined as predetermined amount of time prior to the current time. For example, the relevant time increment could be determined to be the previous ten days, or the last 500 hours. For this embodiment, a clock mechanism is considered to be part of the counter 262, although the physical location of the clock may be anywhere in the control system, for example in the processor 220.

At step 720, the counter 262 determines the number of mailpieces processed during the current time increment. This time increment number is a subset of the total number of mailpieces processed. At step 730, the time increment number is compared to a predetermined limit for that increment. For example, the machine may only be rated to process 100,000 mail pieces per day. Thus the time increment could be set to one day, and the predetermined limit would be 100,000 pieces. Preferably, these limitations would correspond to use limitations identified in the lease agreement.

In one embodiment, if it is determined at step 730 that the predetermined maximum has been exceeded, an inquiry is made at step 740 to see whether the limit has been exceeded previously. Step 740 allows that first time, or accidental, violations result in a warning given at step 760. Upon receipt of the warning, the user can adjust his usage accordingly, or make alternative arrangements to handle an increased capacity. If it is determined that the limit has been repeatedly violated, the machine is shut down at step 750. The number of warnings that may be given can be more than one, and it is not intended that the invention be limited to any particular number of warnings before shutting down the machine.

If the machine has not exceeded the predetermined limit for the time increment, then at step 770 the equipment continues with normal operation, and the counter continues to be decremented in step 780.

It should be understood that the process of FIG. 7 operates in parallel with the prepaid quantity limitations described before. Thus, the machine can halted for operating at too fast a rate, or independent of that criteria, it can be stopped when the prepaid quantity is depleted. These two features can be operated independently to ensure that different aspects of a lease agreement are in compliance.

Thus, although the invention has been described with respect to one or more embodiments thereof, it will be understood by those skilled in the art that the foregoing and various other changes, omissions and deviations in the form and detail thereof may be made without departing from the scope of this invention.

What is claimed is:

1. A method of controlling operation of an inserting machine that inserts one or more items into a mailpiece so as to generate a completed mailpiece, said method comprising the steps of:

maintaining a first counter within the inserting machine so as to decrement a count within the first counter for each mailpiece processed, wherein the count maintained by the first counter is maintained in a inaccessible manner; and disabling the inserting machine if the count within the first counter falls below a first predetermined value.

2. The method according to claim 1, further comprising the step of:

prior to said disabling the inserter machine, generating a warning message if the count within said first counter falls below a second predetermined value greater than the first predetermined; and allowing for entry of information to the first counter so as to allow its count to be incremented.

3. The method according to claim 2, wherein the method further provides maintaining a second counter that corresponds in count to the first counter and for displaying its count.

4. The method according to claim 2, wherein the entry of information to the first counter so as to allow its count to be incremented is a signal corresponding to a predetermined count increment.

5. The method according to claim 4, wherein the signal is provided upon payment for said count increment.

6. The method according to claim 2, wherein the warning message is generated on a display forming part of the inserting machine.

7. The method according to claim 1, further comprising the step of:

storing at least one authorization code in the inserting machine so as to allow the user to use the authorization code to increment the count within the first counter by an amount after the user agrees to pay for said amount.

8. The method according to claim 7, wherein said at least one authorized code is a next one of a sequence of different stored codes and wherein the sequence is changed after the user uses the authorization code to increment the count such that one of stored codes different from said authorization code becomes the next one of the sequence.

9. The method according to claim 8, wherein the codes in the sequence are randomly generated, and the sequence is known to an authorized service center allowing the authorized service center to provide the user the next code to increment the counter within the first counter upon agreeing to pay for said amount.

10. The method according to claim 9, wherein the codes are unique to said inserting machine.

11. The method according to claim 1 further including the steps of defining a predetermined time increment during which the inserting machine operates;

determining a time increment count from the first counter of mailpieces processed during the time increment; and disabling the inserting machine if the time increment count is greater than a predetermined maximum time increment count.

12. The method according to claim 11 wherein the step of defining the predetermined time increment is based on a static period of time between a set beginning date and a set ending date.

13. The method according to claim 11 wherein the step of defining the predetermined time increment is dynamically based on a fixed amount of time prior to a current time.

14. The method according to claim 11 further including a step of displaying an overuse warning prior to disabling the inserting machine based on exceeding the predetermined maximum time increment count.

15. An inserting machine comprising:

a mail inserting mechanism for use to insert one or more items into a mailpiece so as to generate a processed mailpiece;

a first counter operatively connected to the inserting mechanism so as to decrement a count within the first counter for each mailpiece processed, wherein the count maintained by the first counter is maintained in a substantially inaccessible manner; and a locking mechanism for disabling the inserting mechanism if the count within the first counter falls below a first predetermined value.

16. The inserting machine according to claim 15, further comprising a display for showing the count within the first counter.

17. The inserting machine according to claim 15, wherein the locking mechanism can be unlocked by a signal in order to enable the inserting mechanism when the count is incremented so that the count within the first counter is greater than the first predetermined value.

18. The inserting machine according to claim 15, further comprising a storage medium for storing at least one authorization code so as to allow the user to use the authorization code to increment the count within the first counter by an amount after the user agrees to pay for said amount.

19. The inserting machine according to claim 18, wherein said at least one authorized code is a next one of a sequence of different stored codes and wherein the sequence is changed after the user uses the authorization code to increment the count such that one of stored codes different from said authorization code becomes the next one of the sequence.

20. The inserting machine according to claim 19, wherein the codes in the sequence are randomly generated, and the sequence is known to an authorized service center allowing the authorized service center to provide the user the next code to increment the counter within the first counter upon agreeing to pay for said amount.

21. The inserting machine according to claim 15, wherein the first counter is enclosed in a sealed box and wherein the box has means to indicate whether the box has been tampered.

22. The inserting machine according to claim 15 wherein the first counter further includes a time keeping device defining a predetermined time increment during which the inserting machine operates, the first counter programmed to determine a time increment count of mailpieces processed during the time increment, and wherein the locking mechanism is programmed to disable the inserting machine if the time increment count is greater than a predetermined maximum time increment count.

23. The inserting machine according to claim 22 wherein the predetermined time increment is based on a static period of time between a set beginning date and a set ending date.

24. The inserting machine according to claim 22 wherein the predetermined time increment is dynamically based on a fixed amount of time prior to a current time.

25. The inserting machine according to claim 22 further including a display arranged to display an overuse warning prior to disabling the inserting machine based on exceeding the predetermined maximum time increment count.

* * * * *